(12) United States Patent
Takata et al.

(10) Patent No.: US 6,378,369 B1
(45) Date of Patent: Apr. 30, 2002

(54) ANGULAR VELOCITY SENSOR

(75) Inventors: Eiichi Takata, Nagaokakyo; Yoshihiro Konaka; Shinji Kobayashi, both of Sagamihara, all of (JP)

(73) Assignee: Murata Manufacturing Co., LTD (JP)

( * ) Notice: Subject to any disclaimer, the term of this patent is extended or adjusted under 35 U.S.C. 154(b) by 0 days.

(21) Appl. No.: 09/473,490

(22) Filed: Dec. 28, 1999

(30) Foreign Application Priority Data

Jan. 6, 1999 (JP) .......................................... 11-001353

(51) Int. Cl.⁷ ................................................ G01P 9/04
(52) U.S. Cl. ................................. 73/504.14; 73/504.12
(58) Field of Search ........................ 73/504.12, 504.13, 73/504.14, 504.15

(56) References Cited

U.S. PATENT DOCUMENTS

| | | | |
|---|---|---|---|
| 5,126,812 A | 6/1992 | Greiff | 357/25 |
| 5,691,471 A * | 11/1997 | Okazaki et al. | 73/504.04 |
| 5,760,305 A | 6/1998 | Greiff | 73/514.15 |
| 5,889,207 A * | 3/1999 | Lutz | 73/504.13 |
| 6,089,090 A * | 7/2000 | Namerikawa et al. | 73/504.13 |

FOREIGN PATENT DOCUMENTS

| | | |
|---|---|---|
| EP | 0461761 | 5/1991 |
| GB | 2154739 | 2/1985 |
| JP | 6174739 | 6/1994 |

* cited by examiner

Primary Examiner—John E. Chapman
(74) Attorney, Agent, or Firm—Ostrolenk, Faber, Gerb & Soffen, LLP

(57) ABSTRACT

An angular velocity sensor includes a support body, a plurality of beams individually supported by the support body, and a coupling part with which a plurality of the beams are commonly coupled, and a vibrating weight formed on the coupling part, wherein each beam comprises a wide beam part and a narrow beam part narrower than the wide beam part.

12 Claims, 8 Drawing Sheets

ANGULAR VELOCITY SENSOR

BACKGROUND OF THE INVENTION

1. Field of the Invention

The present invention relates to an angular velocity sensor, and more particularly to a micromachined angular velocity sensor, which can be used for a hand shake compensating camera, a car navigation device or the like.

2. Description of the Related Art

As a conventional angular velocity sensor using a micromachining technique, an angular velocity sensor 80 disclosed in Japanese Unexamined Patent Publication No. 6-174739 is described referring to FIGS. 18 and 19. A reference numeral 81 denotes a frame formed by machining a silicon substrate, and beams 82a–82d respectively extending orthogonal to an inner wall of the frame 81 are coupled with each other at a center part of the frame 81. A vibrating weight 83 is formed on a lower part of this center part. These beams 82a–82d and the vibrating weight 83 are integrally formed with each other through the same silicon substrate as the frame 81 using semi-conductor micromachining technology such as photo-etching.

Piezoelectric elements 84a, 84c for drive are formed on an upper surface side of the beams 82a, 82c opposite to each other, while piezoelectric elements 84b, 84d for detection are formed on an upper surface side of the beams 82b, 82d opposite to each other. The piezoelectric elements 84a, 84b for drive and the piezoelectric elements 84b, 84d for detection are of the structure in which a zinc oxide film 87 is interposed between an upper electrode 86a and a lower electrode 86b.

When drive signals which differ in phase by 180° are respectively added to piezoelectric elements 84a and 84c for drive, the beams 82a and 82c vibrate in the vertical direction with a base point 85 as a node as illustrated by the broken line and the two-dot-chain line due to the reversed phase, and a lower tip of the vibrating weight 83 vibrates in the X-axis direction.

When the rotation is thus added about the Z-axis passing through the center of the vibrating weight 83 when the vibrating weight 83 vibrates, the lower tip of the vibrating weight 83 is also vibrated in the Y-axis direction due to the Coriolis force. This vibration is detected as the voltage by the piezoelectric elements 84b, 84d for detection, and the angular velocity of the rotation is obtained by achieving the differential amplification thereof.

In this conventional angular velocity sensor 80, however, internal stress is left behind in the beams 82a–82d due to shrinkage during the crystallization of zinc oxide when the zinc oxide film is formed on silicon to constitute the beams 82a–82d. When the excitation frequency is changed, the excitation amplitude shows a hysteresis characteristic and the excitation vibration becomes unstable.

Further, in the conventional angular velocity sensor 80, the stress in the beams 82a–82d is changed by temperature due to the difference in the coefficient of thermal expansion between silicon and zinc oxide which constitute the beams 82a–82d. The resonance frequencies of the beams 82a, 82c for drive and the beams 82b, 82d for detection are separately changed, and the temperature drift of the angular velocity detection sensitivity is increased thereby.

Also, in the conventional angular velocity sensor 80, no correct symmetry can be obtained due to the error in manufacturing the beams 82a–82d, and the vibration in the X-axis direction escapes in the Y-axis direction, and the lower tip of the vibrating weight 83 effects the elliptic motion with the axis having a certain declination relative to the line X2—X2 as the major axis as illustrated by a broken line in FIG. 18. Thus, an offset voltage is generated in the piezoelectric elements 84b, 84d in a stationary condition, and the angular velocity detection sensitivity and the angular velocity detection resolution are degraded.

SUMMARY OF THE INVENTION

The present invention can provide an angular velocity sensor in which the above-described conventional disadvantages are solved, the angular velocity detection sensitivity is stabilized, and the angular velocity detection resolution is improved.

An angular velocity sensor in accordance with the present invention comprises a support body, a plurality of beams individually supported by the support body, and a coupling part with which a plurality of the beams are commonly coupled, and a vibrating weight formed on the coupling part, in which the each beam comprises a wide beam part and a narrow beam part narrower than the wide beam part.

According to this structure, since a beam is constituted as a coupling part of wide beam parts and narrow beam parts, the internal stress generated in manufacturing the beams, the coupling parts and the support body can be absorbed by the narrow beam parts. Therefore, the angular velocity sensor can be stably operated in a condition where no stress is present, and the detection sensitivity can be stable.

When the vibrating weight vibrates in the extending direction of the beam, or the direction to divide a space between beams into two by exciting the beam, and the narrow beam parts are between the wide beam parts and the coupling part, the vibration of the vibrating weight is absorbed by the narrow beam parts of the beam in the direction where the Coriolis force is generated, and not propagated to the wide beam parts of the beam, and thus, the offset or the noise caused by the escape of the excitation vibration contained in the detected signal to detect the Coriolis force can be reduced. The detection resolution of the angular velocity sensor can be improved thereby. In detecting the Coriolis force, the narrow beam parts of the beam to excitation-vibrate the vibrating weight are deformed, and do not suppress the vibration of the beam to detect the Coriolis force, and the detection sensitivity of the Coriolis force can be improved. When the narrow beam parts are between the wide beam parts and the support body, the coupling body of the wide beam parts with the coupling part is detached from the support body, the vibration energy of the vibrating weight is accumulated in the coupling body, and the coupling body can vibrate in a condition of high mechanical Q, and thus, the detection output by the Coriolis force can be increased.

The narrow beam part of the each beam may be coupled with the coupling part, and the wide beam part may be coupled with the support body.

According to this structure, the internal stress in the beam part is absorbed between the wide beam parts and the vibrating weight. Thus, the excitation vibration by the wide beam parts of the specified beam can be effected without suppression by other beams, and when the Coriolis force is applied to the vibrating weight, the vibration of the beam to detect the Coriolis force can be effected without suppression of the beam to be excitation-vibrated. The vibration in the exciting direction and the vibration in the direction where the Coriolis force is generated are performed without interference with each other in each beam.

Alternatively, the narrow beam part of the each beam is coupled with the support body, and the wide beam part is coupled with the coupling part.

According to this structure, the internal stress in the beam part is absorbed between the wide beam parts and the support body. As a result, the coupling body of the wide beam parts with the coupling part can vibrate like a free vibrating body with the narrow beam parts as end parts. Thus, the coupling body can vibrate in a condition where high mechanical Q is maintained by minimizing the escape of the vibration energy from the coupling body to the support body, and the detection sensitivity of the angular velocity sensor can be improved.

When the specified beam is excited, all beams vibrate together with the vibration of the vibrating weight, and the stress along with the vibration is absorbed by the narrow beam parts, and the excitation vibration is little suppressed by the support body. This also is true when the Coriolis force is applied to the vibrating weight.

Preferably, at least one piezoelectric element is formed on a wide beam part of at least one beam.

According to this structure, the angular velocity sensor can be stably operated in a condition where no initial stress is present, and the sensitivity of the angular velocity can be stable by absorbing the initial stress attributable to the piezoelectric elements formed on the wide beam parts. In particular, in the wide beam parts on which the piezoelectric elements are formed, the hysteresis characteristic of the excitation amplitude to the excitation frequency is reduced, and the unstable excitation vibration of the beam due to this hysteresis characteristic can be reduced by the narrow beam parts.

Further, even when the initial stress in the wide beam parts on which the piezoelectric element is formed is largely changed due to the change in temperature, its initial stress is absorbed by the narrow beam parts, the change in the resonance frequency of the exciting beam and the change in the resonance frequency of the beam to detect the Coriolis force can be reduced, and the temperature dependency of the detection sensitivity is improved to stabilize the detection sensitivity.

According to another aspect, the angular velocity sensor comprises a support body, four beams individually supported by the support body, a coupling part with which the four beams are coupled in an orthogonal manner, and a vibrating weight formed on the coupling part in which the each beam comprises a wide beam part and a narrow beam part, one end of the wide beam part is coupled with the support body, the narrow beam part is coupled between the wide beam part and the coupling part, and at least one piezoelectric element is formed on each wide beam part.

According to this structure, the piezoelectric element is formed on each wide beam part to separate the piezoelectric element to excite the beam from the piezoelectric element to detect the Coriolis force. In this condition, unnecessary vibration to be applied to the piezoelectric element of the detecting beam can be reduced by the action of the narrow beam parts.

According to still another aspect, the angular velocity sensor comprises a support body, four beams individually supported by the support body, a coupling part with which the four beams are coupled in an orthogonal manner, and a vibrating weight formed on the coupling part, in which the each beam comprises a wide beam part and a narrow beam part, one end of the wide beam part is coupled with the coupling part to form a cruciform coupling body, the narrow beam part is coupled between the wide beam part and the support body, and at least one piezoelectric element is formed on each wide beam part.

According to this structure, the narrow beam parts are provided between the cruciform coupling body and the support body, the suppression of the excitation vibration of the coupling body by the support body is reduced, and the coupling body can be efficiently vibrated by the piezoelectric element.

In the angular velocity sensor according to any aspect, a narrow beam part is preferably a beam forming body in which the torsion, deflection elongation and compression of the beam can be coped with by the constitution of the beam forming body. Thus, the internal stress and the initial stress in the beam can be absorbed, and the interference with other beams can be minimized, and more specifically, the mechanical coupling of the wide beam parts with the coupling part or the support body is weakened, and the vibration of one wide beam part is prevented from generating the stress in other wide beam parts.

Each narrow beam part preferably comprises at least one beam forming body of a linear shape, a Y-shape, a T-shape or a coupled linear shape with a ring which is freely deformed, and effective in reducing the transmission of unnecessary forces and in transmitting necessary forces.

For the purpose of illustrating the invention, there is shown in the drawings several forms which are presently preferred, it being understood, however, that the invention is not limited to the precise arrangements and instrumentalities shown.

DETAILED DESCRIPTION THE PREFERRED EMBODIMENTS

Hereinafter, the preferred embodiments of the present invention are explained in more detail with reference to the drawings.

Figure 1A:
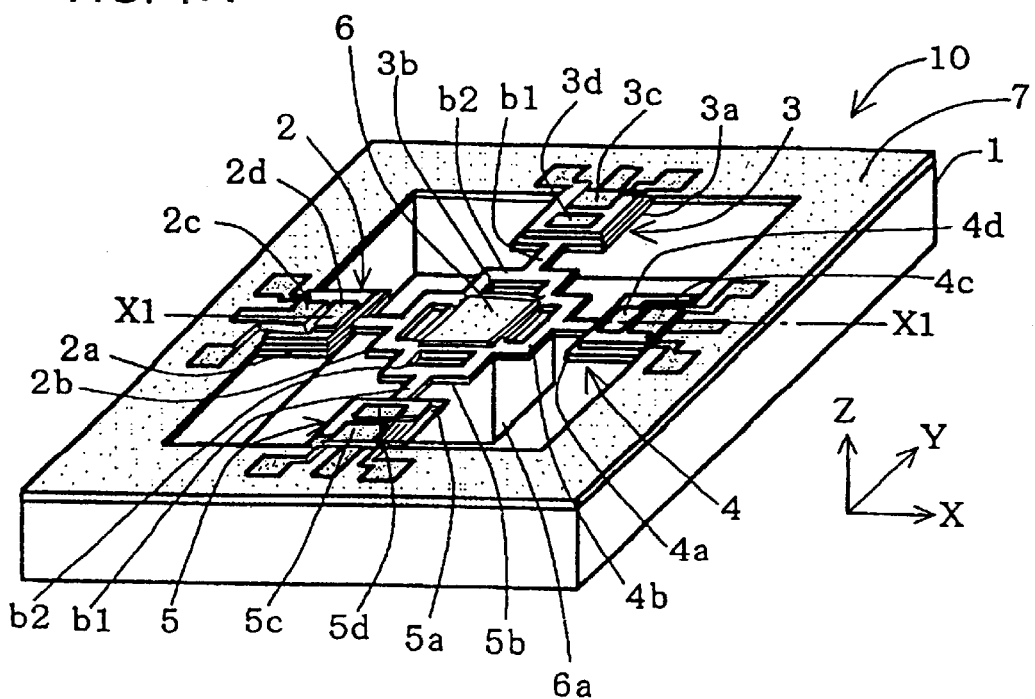
FIG. 1A is a perspective view of a first embodiment of an angular velocity sensor of the present invention.
Figure 1B:
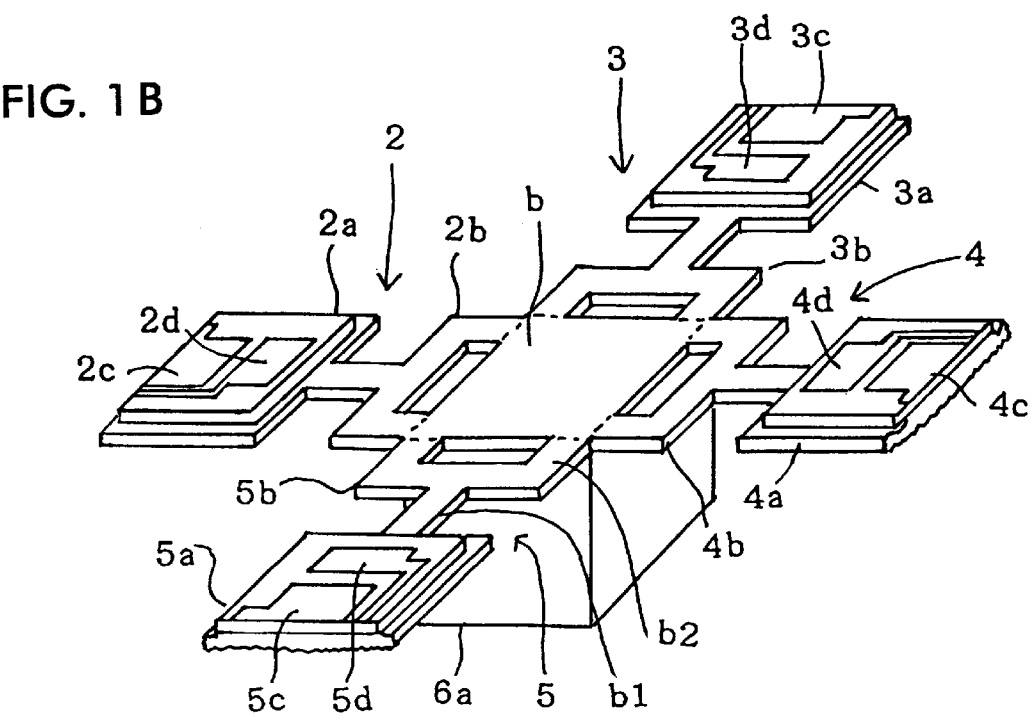
FIG. 1B is a perspective view of an essential portion of the angular velocity sensor shown in FIG, 1A.

An angular velocity sensor 10 of a first embodiment of the present invention is described below referring to FIGS. 1A, 1B and 2. 1 denotes a rectangular frame support body, which is formed by machining an SOI (Silicon On Insulator) substrate comprising a three-layered structure of a silicon substrate 1a, a silicon oxide film 1b and an active layer 1c. 2–5 denote beams, comprising rectangular wide beam parts 2a–5a and Y-shaped narrow beam parts 2b–5b. One end face of the wide beam parts 2a–5a is respectively coupled with an inner side surface of the frame support body 1, and the other end face is coupled with one end of a beam b1 of the narrow beam part 2b–5b. The other end of the beam b is coupled with a center part of a U-shaped beam b2, and the narrow beam parts are Y-shaped as a whole. Two forward ends of the U-shaped beam b2 are respectively coupled with a coupling part 6. The narrow beam parts 2b–5b work as a universal joint to connect the wide beam parts 2a–5a of the beams 2–5 to the coupling part 6. The width of the respective beams b1, b2 are approximately ⅓ to ⅙ that of the wide beam parts 2a–5a. The length of the narrow beam parts 2b–5b are different from each other according to the structure of the beams 2–5, and approximately ⅓ to ⅕ that of the wide beam parts 2a, 5a. A vibrating weight 6a is provided on a lower part of the coupling part 6, and the four beams 2–5 are arranged orthogonal to each other around the coupling part 6.

A silicon oxide film 7 is formed on an upper surface of the frame support body 1, the beams 2–5 and the coupling part 6. A lower electrode 8 and its lead terminal are formed on the silicon oxide film 7 of an upper surface of the wide beam parts 2a–5a and the frame support body 1. A piezoelectric film 9 of zinc oxide, lead zircon titanate or the like is formed on the lower electrode 8 on the upper surface of the wide beam parts 2a–5a. Two split upper electrodes 2c(2d)–5c(5d) are respectively formed onto the piezoelectric film 9, and the lead terminal is respectively lead from these upper electrodes 2c(2d)–5c(5d) onto the silicon oxide film 7 on the upper side of the frame support body 1.

A piezoelectric element is constituted by interposing the piezoelectric film 9 between the upper electrodes 2c(2d)–5c (5d)and the lower electrode 8, and the beams 2–5 provided with these piezoelectric devices constitute the piezoelectric vibration beams 2–5. These piezoelectric vibration beams 2–5 are also referred to as driving beams or detecting beams according to the applications. The above-described beams 2–5 and the coupling part 6 are integratedly formed with each other by machining the silicon active layer 1c of the SOI substrate.

Figure 19:
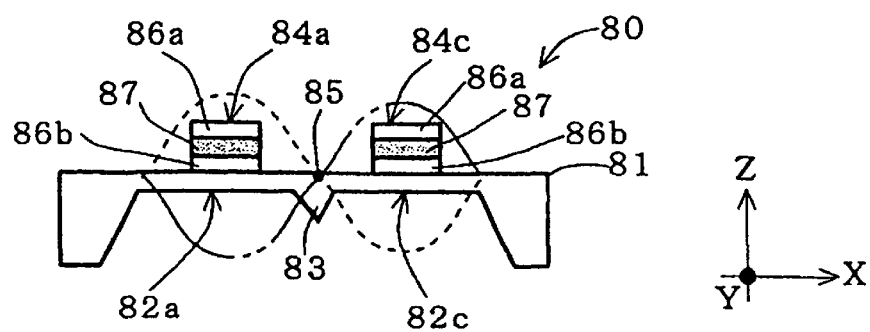
FIG. 19 is a vibrational mode view at the line X2—X2 of FIG. 18.

The operation of the angular velocity sensor 10 of the present embodiment is as follows. AC voltages different in phase by 180° from each other to which a DC voltage are superposed are respectively applied to the upper electrodes 2c(2d)–4c(4d) of the piezoelectric vibration beams 2 and 4 opposite to each other on Y-axis with the lower electrode 8 as a common ground. Then, the piezoelectric vibration beams 2 and 4 continuously effect a bending motion (vibration) in which the piezoelectric vibration beam 2 is bent upward and the piezoelectric vibration beam 4 is bent downward, or the bending motion (vibration) in the direction opposite thereto, for example, as illustrated in FIG. 19 by a broken line with a base point 6b of the coupling part 6 as a node. A lower center point 6c of a vibrating weight 6a vibrates in the X-axis direction by the bending vibration in the vertical direction.

When the vibrating weight 6a vibrates, and rotation is applied about the Z-axis passing through the center of the base point 6b (of the vibrating weight 6a) of the coupling part 6, the lower center point 6c of the vibrating weight 6a is also vibrated in the Y-axis direction by the Coriolis force. The piezoelectric vibration beams 3 and 5 are bent upward on one side while the other is bent downward as illustrated in FIG. 19 by this vibration. The voltage of the reversed polarity whose phase is reversed is generated in these piezoelectric elements by the bending. The generated voltage is obtained from the upper electrodes 3c(3d) and 5c(5d), and the differential amplification thereof is achieved to obtain the angular velocity of the rotation.

In the angular velocity sensor 10 of the present embodiment, the beams 2–5 are machined out of the silicon active layer 1c as described above, and comprise the wide beam parts 2a–5a and the narrow beam parts 2b–5b. The piezoelectric film 9 is provided on the active layer 1c of the wide beam parts 2a–5a. In the wide beam parts 2a–5a, the initial stress is left behind at normal temperature due to the difference in the coefficient of thermal expansion between the piezoelectric film 9 and the active layer 1c.

However, in the angular velocity sensor 10 of the present embodiment, the stress generated in the wide beam parts 2a–5a of the beams 2–5 by the piezoelectric film 9 is absorbed mainly by the torsion, deflection and deformation of the beams b1, b2 of the narrow beam parts 2b–5b softer than the wide beam parts 2a–5a, and effects an action to prevent the transmission of the stress to the vibrating weight 6a. These narrow beam parts 2b–5b also effect the action to absorb the internal stress along with the machining deformation of the beams 2–5.

When the vibrating weight vibrates in the X-axis direction by driving the piezoelectric elements of the beams 2 and 4, the beams 2, 4 are bent at the narrow beam parts 2b, 4b to increase the vibration of the vibrating weight. In the beams 3, 5 in the Y-axis direction orthogonal to the beams 2, 4, the beam b1 of the narrow beam parts 3b, 5b is mainly twisted, and the vibrational action of the vibrating weight is not propagated to the wide beam parts 3a, 5a. That is, no mutual interference is generated by the vibrations in the X-axis direction and in the Y-axis direction. The escape of the vibration of the driving beam to the detecting beam side is reduced, and the elliptical motion of the vibrating weight 6a is reduced due to these actions of the narrow beam parts 2b–5b.

When the angular velocity sensor is rotated about the Z-axis, a part equivalent to a free end of the wide beam parts 3a, 5a bent at the narrow beam parts 3b, 5b of the beams 3, 5 is largely moved by the Coriolis force to vibrate the wide beam parts 3a, 5a and the electric output is obtained from the piezoelectric element. In this action, the narrow beam parts 3b, 5b of the beams 2, 4 are twisted mainly at the beam b1, and do not suppress the vibration by the Coriolis force.

The excitation vibration caused by the hysteresis characteristic of the excitation amplitude to the excitation frequency is stabilized, the drift of the output of the detection of the angular velocity is reduced due to the temperature characteristic of the driving beam and the detecting beam, the offset voltage is also dropped, and the sensitivity of detecting the angular velocity and the resolution of detecting the angular velocity are improved.

Figure 3:
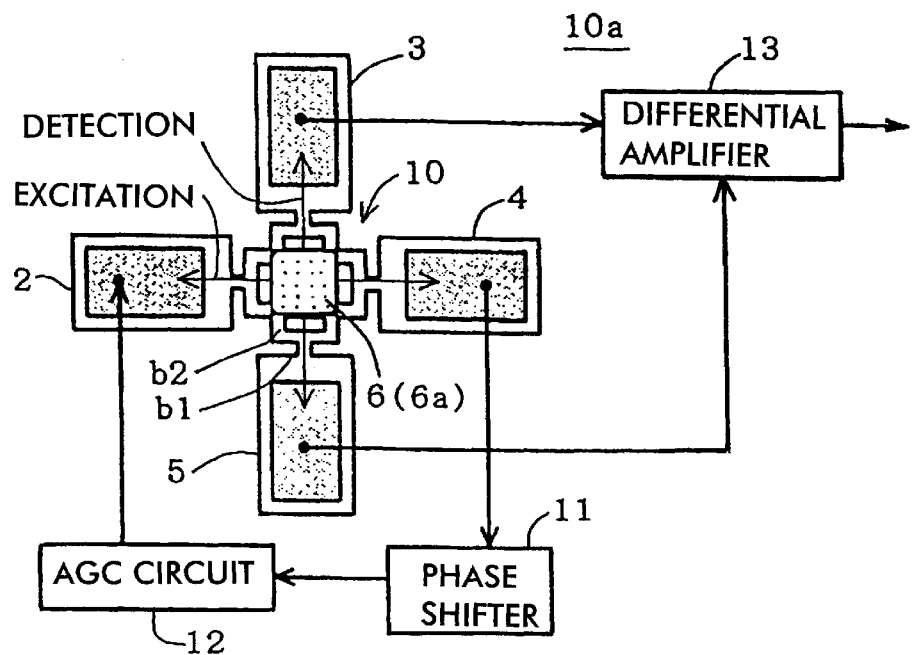
FIG. 3 is an operational block diagram of the angular velocity sensor of the first embodiment.

Next, an angular velocity detection circuit 10a employing a self-vibration circuit constituted using the angular velocity sensor 10 is described referring to FIG. 3. The piezoelectric vibration beam 2 is used for drive, the piezoelectric vibration beam 4 is for feedback, and the piezoelectric vibration beams 3, 5 are for detecting the angular velocity. An output terminal of the piezoelectric vibration beam 4 for feedback is connected to a phase shifter 11, and an output terminal of the phase shifter 11 is connected to an AGC circuit (Automatic Gain Control circuit) 12, and an output terminal of the AGC circuit 12 is connected to the piezoelectric vibration beam 2 for drive. The piezoelectric vibration beam 2 for drive is mechanically coupled with the piezoelectric vibration beam 4 for feedback through the coupling part 6 (the vibrating weight 6a). A closed circuit with the piezoelectric vibration beam 4—the phase shifter—the AGC circuit 12 the piezoelectric vibration beam 4 as a loop constitutes the self-vibration circuit. Output terminals of the piezoelectric vibration beams 3, 5 for detection are respectively connected to a differential amplifier 13.

The operation of the angular velocity detection circuit 10a illustrated in FIG. 3 is as follows. In the angular velocity detection circuit 10a, when a power source not indicated in the figure is switched on, the vibration of the above-described self-vibration circuit is started, and the vibration is continued by the mechanical frequency of resonance to be determined by the piezoelectric vibration beams 2–5 and the vibrating weight 6a. As for the mode of vibration, the output of the piezoelectric vibration beam 4 for feedback is shifted by 180° by the phase shifter 11 because the piezoelectric vibration beam 2 for drive is different from the piezoelectric vibration beam 4 for feedback by 180°, and the output is amplified by the AGC circuit 12 and inputted in the piezoelectric vibration beam 2 for drive to satisfy the condition of vibration of the phase and the gain.

If the rotation is added about the axis passing through the center of the vibrating weight 6a perpendicular to the plane of the figure when the vibrating weight 6a is excitation-vibrated by the piezoelectric vibration beam 2, 4, the vibrating weight 6a vibrates due to the Coriolis force in the direction orthogonal to the vibrating direction before the rotation is added, the piezoelectric vibration beams 3, 5 for detection respectively effect the bending vibration in the vertical directions opposite to each other, and the voltage of the reversed polarity whose phase is reversed is generated. This voltage of the reversed polarity is differentially-amplified by the differential amplifier 13 to obtain the angular velocity of the rotation.

Figure 4:
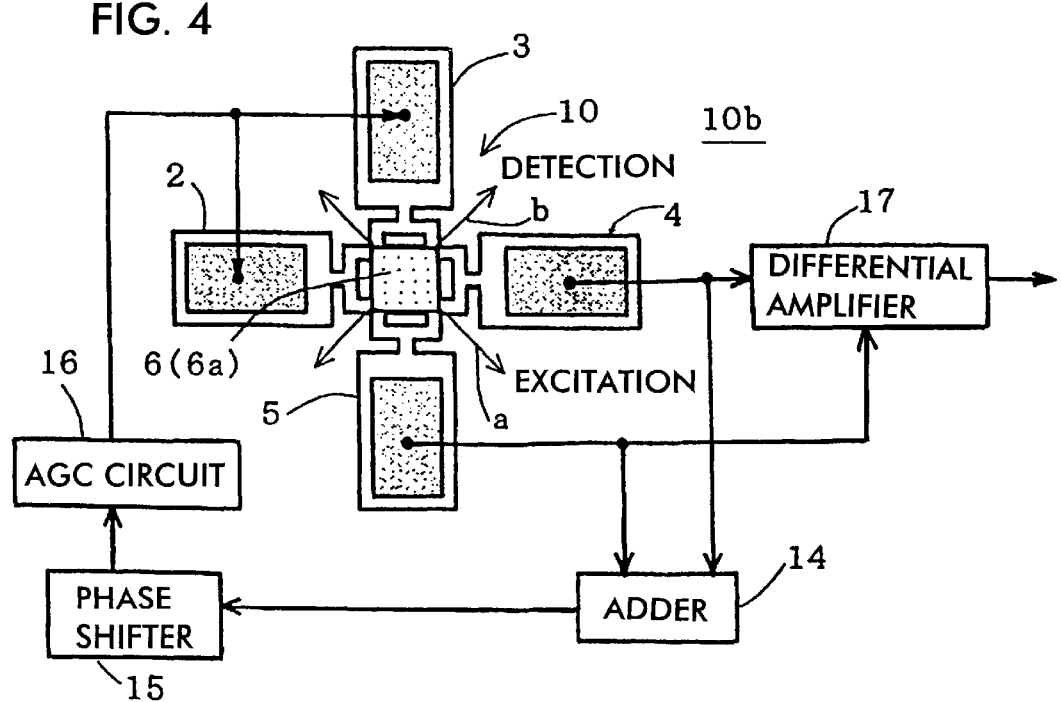
FIG. 4 is another operational block diagram of the angular velocity sensor of the first embodiment.

Another angular velocity detection circuit 10b employing a self-vibration circuit using the angular velocity sensor 10 is described referring to FIG. 4. In this angular velocity detection circuit 10b, adjacent piezoelectric vibration beams 2, 3 are for drive, and the piezoelectric vibration beams 4, 5 are for detection and feedback. The self-vibration circuit comprises a closed circuit consisting of the piezoelectric vibration beams 4, 5 for detection, an adder 14, the phase shifter 15, the AGC circuit 16, the piezoelectric vibration beams 2, 3 for drive, the coupling part 6 (the vibrating weight 6a), and the piezoelectric vibration beams 4, 5. Output terminals of the piezoelectric vibration beams 4, 5 are connected to a differential amplifier 17.

The operation of the angular velocity detection circuit 10b illustrated in FIG. 4 is as follows. In the angular velocity detection circuit 10b, when a power source not indicated in the figure is switched on, the vibration of the self-vibration circuit is started, and the vibration is continued by the mechanical frequency of resonance to be determined by the piezoelectric vibration beams 2–5 and the vibrating weight 6a. The piezoelectric vibration beams 2, 3 are simultaneously excited when the voltage of the same voltage is applied. As a result, the lower center point of the vibrating weight 6a vibrates in the direction of an arrow a to divide into two a space between the piezoelectric vibration beams 2 and 3.

If the angular velocity sensor 10 is rotated about the axis passing through the center of the vibrating weight 6a perpendicular to the plane of the figure when the vibrating weight 6a is thus excitation-vibrated in the direction of the arrow a by the piezoelectric vibration beams 2, 4, the vibration based on the Coriolis force is generated in the direction of an arrow b orthogonal to the direction of the arrow a. The generated voltage of the piezoelectric vibration beams 4, 5 by the vibration in the direction of this arrow b becomes the voltage of the reversed polarity whose phase is reversed, and the angular velocity of the rotation can be obtained through the differential amplification by the differential amplifier 17. Because the piezoelectric vibration beams 4, 5 also generate the voltage of the same polarity in the direction of the arrow a by the excitation vibration by the piezoelectric vibration beams 2, 3, the voltage of the reversed polarity generated in the piezoelectric vibration beams 4, 5 is added by the adder 14 to be canceled, while the voltage of the same polarity is added by the adder 14 to generate the signal of approximately the same phase as that of the drive voltage to be applied to the piezoelectric vibration beams 2, 3. The closed circuit becomes the self-vibration circuit by achieving the feedback of this signal through the phase shifter 15.

Figure 5:
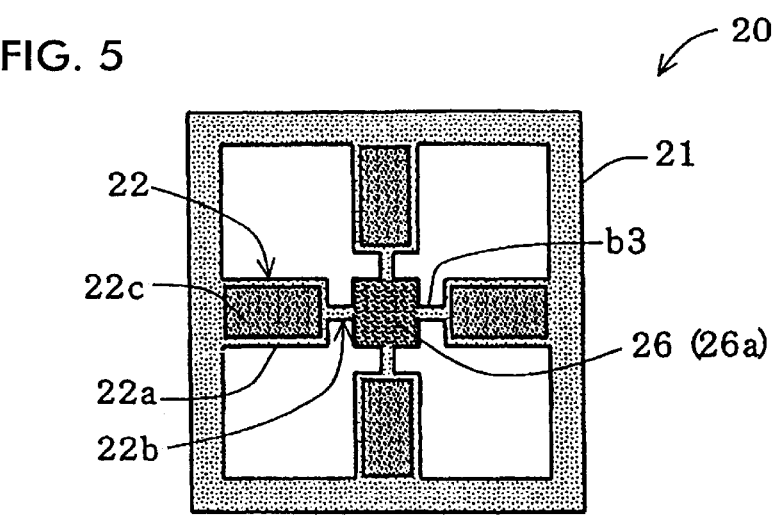
FIG. 5 is a top plan view of a second embodiment of the angular velocity sensor of the present invention.

An angular velocity sensor 20 of a second embodiment of the present invention is described referring to FIG. 5. Rectangular wide beam parts 22a are extended from four inner side surfaces of a frame support body 21. Piezoelectric elements 22c are formed on an upper surface of these wide beam parts 22a similar to the first embodiment. Narrow beam parts 22b comprising a linear beam b3 are formed on the tip of the wide beam parts 22a. The tip of the beam forming beam part 22b is coupled with a coupling part 26. A vibrating weight 26a is formed on a lower side of the coupling part 26. The wide beam part 22a and the narrow beam part 22b constitute a linear piezo electric vibration beam 22.

The beam forming part 22b performs the actions of torsion and deflection, and softly couple the beams 2–5 with the coupling part 26. Other actions and effects are similar to those of the narrow beam parts 2b–5b of the first embodiment.

Figure 6:
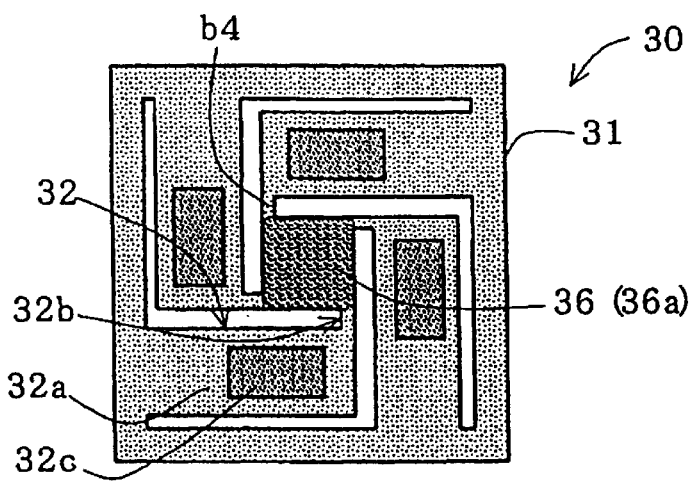
FIG. 6 is a top plan view of a third embodiment of the angular velocity sensor of the present invention.

An angular velocity sensor 30 of a third embodiment of the present invention is described referring to FIG. 6. An L-shaped beam 32 is provided with a rectangular wide beam part 32a and a narrow beam part 32b which is extended from one corner part of a tip surface of this wide beam part 32a in the direction at 90° relative to the longitudinal direction of the wide beam part 32a. This L-shaped beam 32 couples root parts of the wide beam parts 32a with four inner side surfaces of a frame support body 31, and couples the tip of the narrow beam part 32b with a corner part of a coupling part 36, forming a spiral shape as a whole. A vibrating weight 36a is provided on a lower part of the coupling part 36. A piezoelectric element 32c is provided on an upper surface of the wide beam part 32a similar to the first embodiment.

In the present embodiment, the narrow beam part 32b is coupled with the corner of the wide beam part 32a and the corner of the coupling part 36, the wide beam part 32a of the driving beam vibrates in a torsional manner, and the coupling part 36 (the vibrating weight 36a) vibrates so as to be rotated with the narrow beam part 32b of the detecting beam as the axis. In this condition, a beam b4 of the narrow beam part 32b of the driving beam performs the action of deflection, while the beam b4 of the detecting beam performs the action of torsion. Other actions and effects of the present embodiment are similar to those of the narrow beam parts 2b–5b of the first embodiment.

Figure 7:
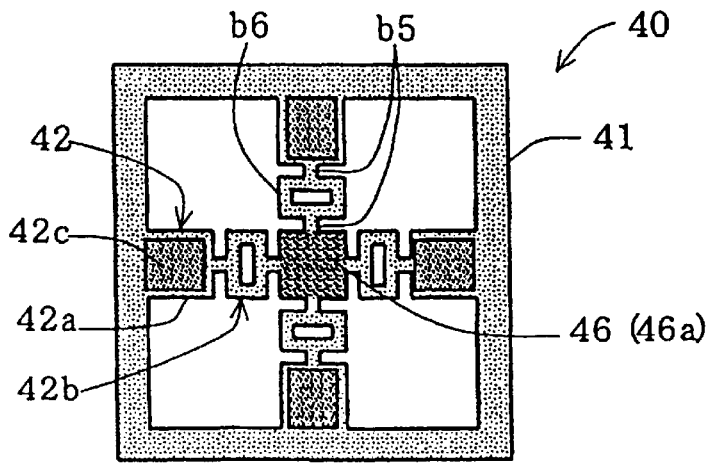
FIG. 7 is a top plan view of a fourth embodiment of the angular velocity sensor of the present invention.

An angular velocity sensor 40 of a fourth embodiment of the present invention is described referring to FIG. 7. Root parts of rectangular wide beam parts 42a are respectively coupled with four inner side surfaces of a frame support body 41. The tips of the wide beam parts 42a are coupled with one beam b5 of narrow beam parts 42b of a linear beam b6 comprising a ring-like beam b6 and a straight beam b5 on each side, and the other beam is coupled with a coupling part 46. A vibrating weight 46a is provided on a lower part of the coupling part 46. A piezoelectric element 42c is provided on the wide beam part 42a similar to the first embodiment.

In the present embodiment, the narrow beam parts 42b are easily twisted by the deformation of the beam 6 added to the torsion of two beams b5, and largely deflected by the deflection of mainly two beams b5. For the tensile stress exerted in the narrow beam parts 42b, a beam b6 is deformed and elongated, while for the compressive stress exerted in the narrow beam parts 42b, the beam b6 is deformed, and the beam b5 is deflected. Other actions and effects are similar to those of the narrow beam parts 2b–5b of the first embodiment.

Figure 8:
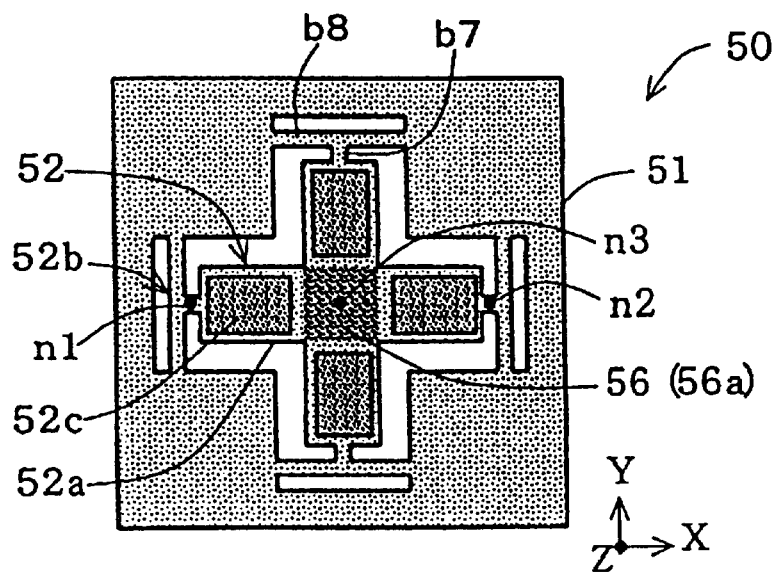
FIG. 8 is a top plan view of a fifth embodiment of the angular velocity sensor of the present invention.

An angular velocity sensor 50 of a fifth embodiment of the present invention is described referring to FIG. 8. This embodiment is characterized in that a narrow beam part 52b is provided between the support body 5 and a wide beam part 52b. A beam 52 comprises a rectangular wide beam part 52a and a T-shaped narrow beam part 52b. Both ends of a straight beam b8 of the narrow beam part 52b are coupled with a frame support body 51, and a straight beam 7 is coupled between a center part of the beam b8 and the wide beam part 52a. The other end face of the wide beam part 52a is coupled with a coupling part 56. A vibrating weight 56a is provided on a lower part of the coupling part 56. A piezoelectric element 52c is provided on an upper surface of the wide beam part 52a similar to the first embodiment.

In the angular velocity sensor 50 of the present embodiment, when the piezoelectric vibration beam 52 vibrates in the secondary vibration mode, a coupled body comprising four wide beam parts 52a and the coupling part 56 effects the bending vibration with coupled parts of the wide beam parts 52a and the narrow beam parts 52b of the driving beam as nodes n1, n2, and with a center of the coupling part 56 as a node n3. In this condition, a beam b8 of the narrow beam parts 52b of the driving beam effects the torsion, and a beam b7 of the narrow beam parts 52b of the detecting beam effects the torsion to vibrate the coupled body in a free vibration mode. Other actions and effects of the present embodiment are similar to those of the narrow beam parts 2b–5b of the first embodiment.

Figure 9:
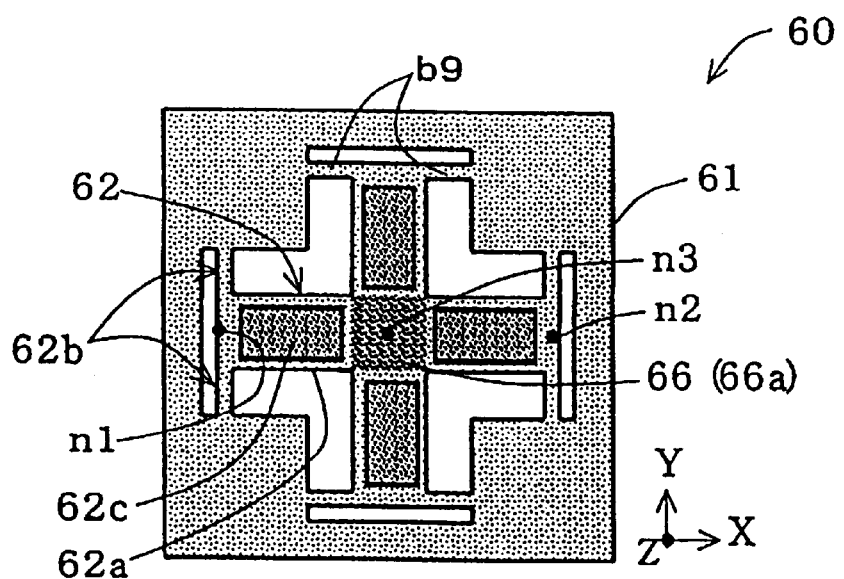
FIG. 9 is a top plan view of a sixth embodiment of the angular velocity sensor of the present invention.

An angular velocity sensor 60 of a sixth embodiment of the present invention is described referring to FIG. 9. This embodiment is also characterized in that narrow beam parts 62b of a beam 62 are provided between wide beam parts 62a and a support body 61. The beam 62 comprises rectangular wide beam parts 62a and narrow beam parts 62b respectively extending from both corner parts of one end face of the wide beam parts 62a in the direction orthogonal to the longitudinal direction. Both ends of the beam forming beam parts 62b are coupled with inner side surfaces of a frame support body 61, and other end face of the wide beam parts 62a is coupled with a coupling part 66. A vibrating weight 66a is provided on a lower part of the coupling part 66. A piezoelectric element 62c is provided on an upper surface of the wide beam parts 62a similar to the first embodiment.

The angular velocity sensor 60 of the present embodiment effects the bending vibration with three nodes n1, n2, n3 as the nodes similar to the fifth embodiment when the piezoelectric vibration beam 62 vibrates in the secondary vibration mode. When the piezoelectric vibration beam 62 in the X-axis direction effects the bending vibration, a beam b9 of the narrow beam parts 62b performs the action of torsion, and the beam b9 of the narrow beam parts 62b of the detecting beam performs the action of torsion for the vibration in the Y-axis direction due to Coriolis force. Other actions and effects of the present embodiment are similar to those of the narrow beam parts 2b–5b of the first embodiment.

Figure 10:
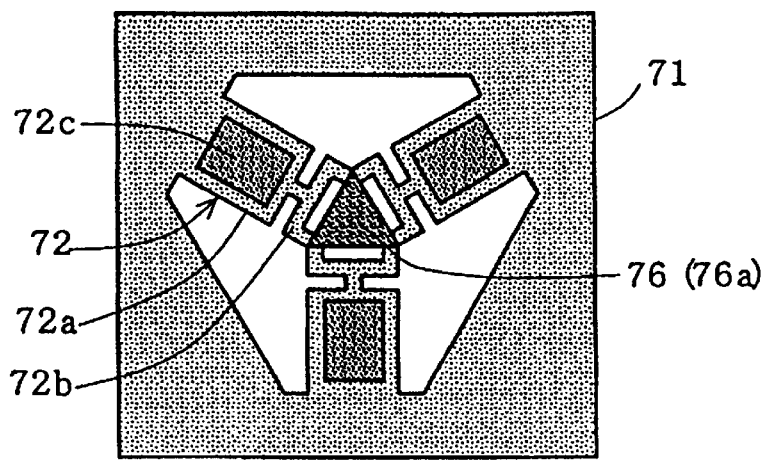
FIG. 10 is a top plan view of a seventh embodiment of the angular velocity sensor of the present invention.

An angular velocity sensor 70 of a seventh embodiment of the present invention is described referring to FIG. 10. This angular velocity sensor 70 comprises three piezoelectric vibration beams 72 while the angular velocity sensor 10 illustrated in FIG. 1 comprises four piezoelectric vibration beams. The shape of the piezoelectric vibration beams 72 is approximately same as that illustrated in FIG. 1. That is, the piezoelectric vibration beams 72 comprise rectangular wide beam parts 72a and narrow beam parts 72b with piezoelectric elements 72c formed thereon. Three piezoelectric vibration beams 72 apart from each other with angular intervals of 120° couple root parts of the wide beam parts 72a with inner side surfaces of a frame support body 71, and couple two tip parts of the narrow beam parts 72b with a coupling part 76. A vibrating weight 76a is formed on a lower part of this coupling part 76.

The effects of the piezoelectric vibration beams 72 of the present embodiment are the same as those described for the angular velocity sensor 10. Also, in the present embodiment, the angular velocity sensor can be operated by designating, for example, two of the beams for driving and detecting out of three piezoelectric vibration beams 72, and the remainder for feedback.

A manufacturing method of the angular velocity sensor 10 illustrated in FIG. 1 is as follows.

Figure 11:
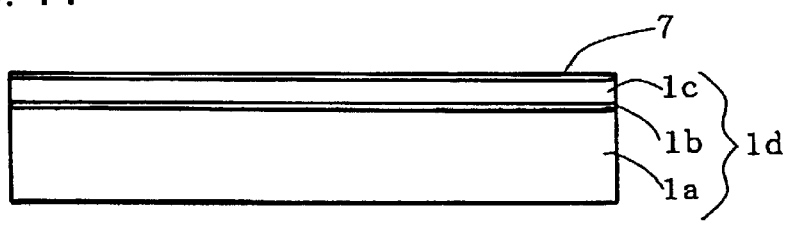
FIG. 11 is a process view of forming a silicon oxide film on an SOI substrate.

In FIG. 11, an SOI (Silicon On Insulator) substrate 1d comprising a three-layered structure of a silicon substrate 1a and a silicon oxide film 1b of 500 $\mu$m in thickness, and an active layer 1c of 20 $\mu$m in thickness is prepared. A silicon oxide film 7 is formed on an upper surface of the active layer 1c of this SOI substrate 1d by a sputtering method, a chemical vapor growth method etc.

Figure 12:
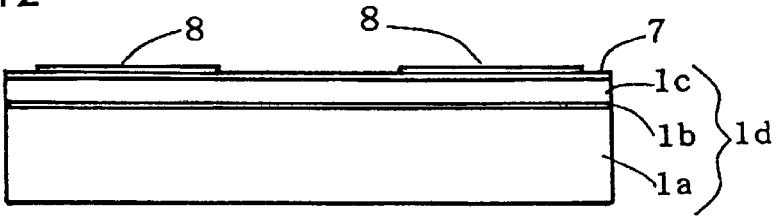
FIG. 12 is a process view of forming a lower electrode.

In FIG. 12, a metallic film such as gold (Au)/chromium (Cr) and aluminum (Al) of 0.1–0.3 $\mu$m in thickness is formed on an upper surface of the silicon oxide film 7 by a vapor deposition method or the sputtering method. This metallic film is machined using the photo-etching technology to form the lower electrode 8.

Figure 13:
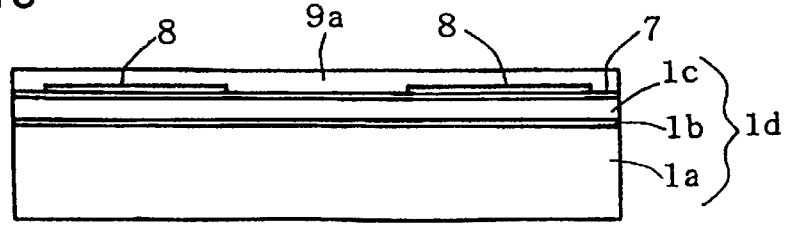
FIG. 13 is a process view of forming a zinc oxide film.

In FIG. 13, a zinc oxide (ZnO) film 9a of 2–10 $\mu$m in thickness is formed on the silicon oxide film 7 including the lower electrode 8 using an RF magnetron sputtering method, the chemical phase growth method or the like. A piezoelectric element is completed in this process.

Figure 14:
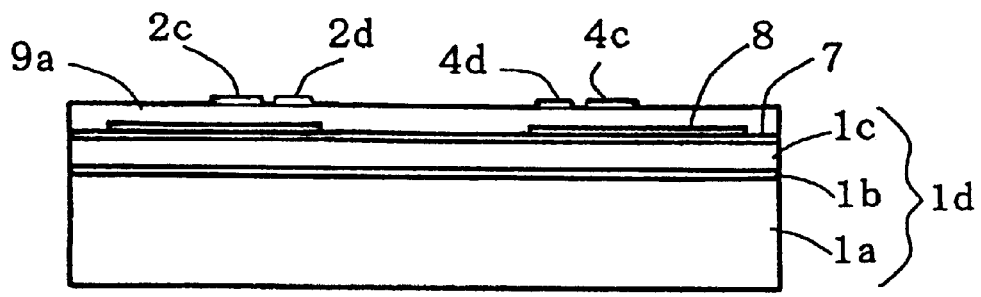
FIG. 14 is a process view of forming an upper electrode.

In FIG. 14, upper electrodes 2c(2d)–5c(5d) of 0.1–0.3 μm in thickness are formed of a metallic film such as gold (Au)/chromium (Cr), and aluminum (Al) using a lift-off method.

Figure 15:
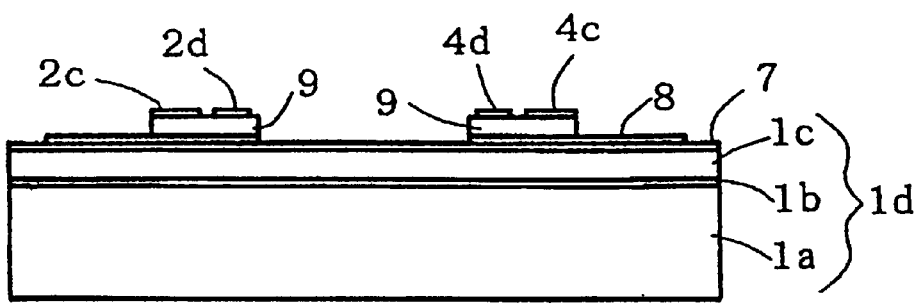
FIG. 15 is a process view of forming an oxide zinc film.

In FIG. 15, a piezoelectric film 9 is formed by patterning the zinc oxide film 9a through dry etching using a resist mask.

Figure 16:
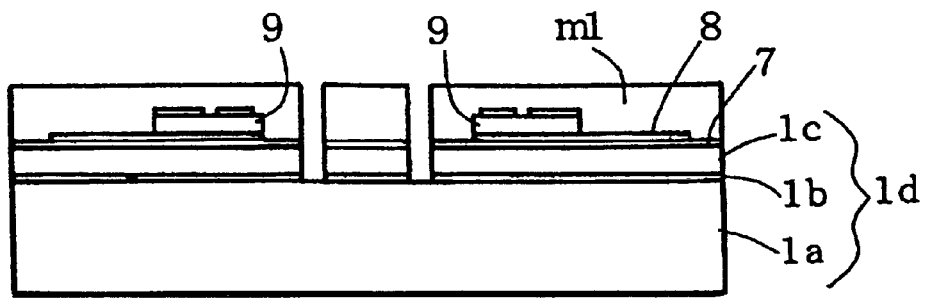
FIG. 16 is a process view of forming a beam or the like by machining an active layer in the vertical direction.

In FIG. 16, a resist mask m1 is formed on a face shape of the angular velocity sensor 10 illustrated in FIG. 1. The silicon oxide film 7, the active layer 1c and the silicon oxide film 1a are perpendicularly machined through dry etching using this resist mask ml by changing each etching gas.

Figure 17:
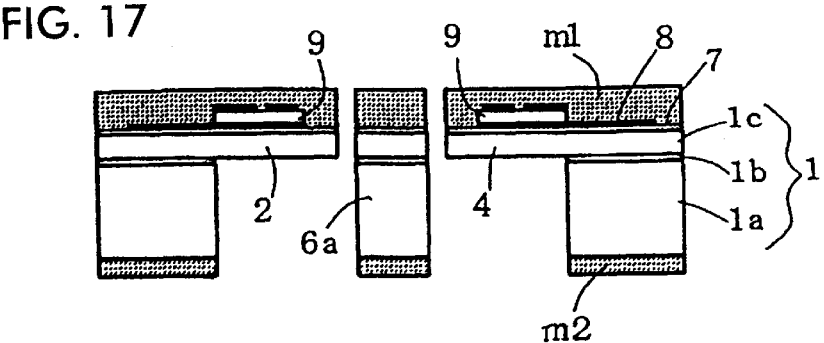
FIG. 17 is a process view of forming a vibrating weight, a beam and a frame support body by machining a silicon substrate in a vertical direction.
Figure 18:
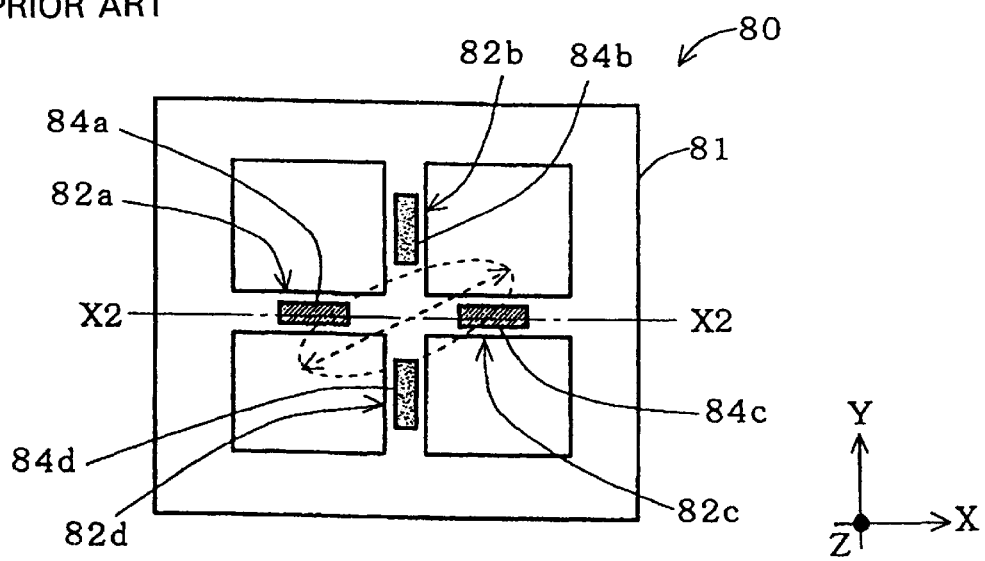
FIG. 18 is a top plan view of a conventional angular velocity sensor.

In FIG. 17, a resist mask m2 is formed on a back shape of the frame support body 1 and the vibrating weight 6a. The silicon substrate 1a and the silicon oxide film 1a are perpendicularly machined through dry etching using this resist mask m2 by changing each etching gas. And, the vibrating weight 6a, the piezoelectric vibration beams 2–5, and the frame support body 1 are thereby formed.

Figure 2:
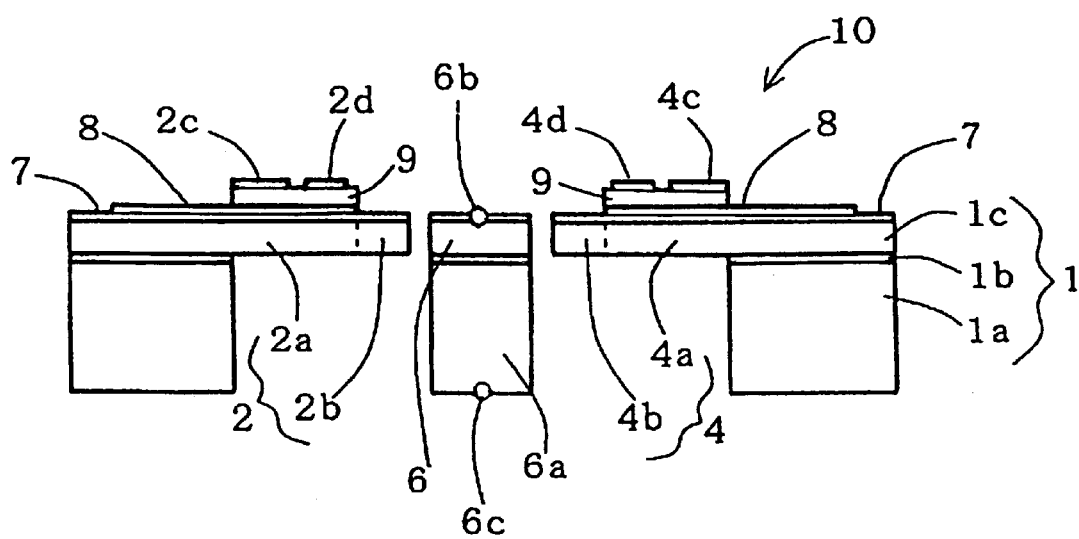
FIG. 2 is a schematic cross-sectional view at the line X1—X1 of the FIG. 1.

The resist mask m2 is removed through oxygen (O2) ashing to manufacture the angular velocity sensor 10 as illustrated in FIG. 2.

In the above-described embodiment, angular velocity sensors of piezoelectric drive type and the piezoelectric detection type are illustrated, but the angular velocity sensor comprising an angular velocity sensor of electrostatic drive type, an angular velocity sensor of electrostatic detection type, or the combination thereof may be constituted. In this structure of the electrostatic drive type or the electrostatic detection type, an electrostatic electrode is provided on a support body on a lower side of the wide beam part, the voltage is applied to this electrostatic electrode and the wide beam parts to drive the beam, and to detect the beam by a similar structure.

In the above-described explanation, an example is described where the narrow beam part is smaller in beam width than the wide beam part, but a case is also acceptable where the beam width of the narrow beam part is smaller than that of the wide beam part, and the thickness of the narrow beam part is smaller than that of the wide beam part.

By supplying the AC drive signal to the piezoelectric element, the wide beam part effects the bending vibration with the piezoelectric element as a source of vibration, and the vibrating weight vibrates in the specified direction. That is, when the piezoelectric element is provided on one beam, the vibrating weight vibrates in the extending direction of the beam, and when the piezoelectric element is provided on not less than two beams, the vibrating weight vibrates in the vibrating direction in which the vibrating direction of each beam is synthesized. Further, except when one piezoelectric element is used both for drive and for detection, the piezoelectric element for drive is separated from the piezoelectric element for detection, and they are provided on the wide beam part of a common beam, or on the wide beam parts of separate beams.

When the narrow beam part is formed between the wide beam part and the coupling part, and the vibrating weight vibrates in the specified direction by the expansion/contraction of the piezoelectric element, the vibration having the component orthogonal thereto is absorbed by the narrow beam part, and does not affect the piezoelectric element. When the narrow beam part is formed between the wide beam part and the support body, the stress in the support body of the wide beam part is reduced, and the coupling body is little restricted by the support body and can effect the bending vibration even when the coupling body comprising the wide beam part and the coupling part vibrates by the piezoelectric element.

When one piezoelectric element is formed on the wide beam part of each beam, the beams are classified as either exiting beams to excite the vibrating weight or detecting beams to detect the vibration of the vibrating weight. When the AC drive signal is applied to the piezo electric element of the exciting beam to vibrate the vibrating weight in the extending direction of the exciting beam, the narrow beam part is twisted and no vibration of the vibrating weight is propagated to the detecting beam orthogonal to the exciting beam. Thus, no electric signal is generated in the piezoelectric element of the detecting beam. When the Coriolis force is applied to the vibrating weight during the excitation vibration, the wide beam part of the detecting beam vibrates and the piezoelectric element outputs the electric signal. In this condition, no Coriolis force is applied to the exciting beam by the torsion of the narrow beam part.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. An angular velocity sensor, comprising: a support body, a plurality of beams individually supported by the support body, a coupling part with which a plurality of the beams are commonly coupled, and a vibrating weight formed on the coupling part, wherein each beam comprises a wide beam part and a narrow beam part narrower than the wide beam part, wherein the narrow beam part of the each beam is coupled directly with the coupling part, and the wide beam part is coupled with the support body and at least one piezoelectric element is formed on the wide beam part of at least one beam.

2. An angular velocity sensor according to claim 1, wherein each narrow beam part comprises at least one beam body of a linear shape, a Y-shape, a T-shape or a coupled linear shape with a ring.

3. An angular velocity sensor according to claim 1, wherein there are four beams, one of the beams being a drive beam, one of the beams being a feedback beam and two of the beams being detection beams.

4. An angular velocity sensor according to claim 3, further including a drive circuit connected to the drive beam, a feedback circuit connected to the feedback beam and a detection circuit connected to the detection beams.

5. An angular velocity sensor, comprising: a support body, four beams individually supported by the support body, a coupling part with which the four beams are coupled in an orthogonal manner, and a vibrating weight formed on the coupling part, wherein each beam comprises a wide beam part and a narrow beam part, one end of the wide beam part being coupled directly with the support body, the narrow beam part being coupled between the wide beam part and the coupling part, and at least one piezoelectric element being formed on each wide beam part.

6. An angular velocity sensor according to claim 5, wherein each narrow beam part comprises at least one beam forming body of a linear shape, a Y-shape, a T-shape or a coupled linear shape with a ring.

7. An angular velocity sensor according to claim 6, wherein one of the beams is a drive beam, one of the beams is a feedback beam and two of the beams are detection beams and further including a drive circuit connected to the drive beam, a feedback circuit connected to the feedback beam and a detection circuit connected to the detection beams.

8. An angular velocity sensor according to claim 7, wherein each of the support body, the four beams, the coupling part and the vibrating weight is formed from a silicon on insulator substrate.

9. An angular velocity sensor, comprising: a support body, four beams individually supported by the support body, a coupling part with which the four beams are coupled in an orthogonal manner, and a vibrating weight formed on the coupling part, wherein each beam comprises a wide beam part and a narrow beam part, one end of the wide beam part being coupled directly with the coupling part to form a cruciform coupling body, the narrow beam part being coupled between the wide beam part and the support body, and at least one piezoelectric element being formed on each wide beam part.

10. An angular velocity sensor according to claim 9, wherein each narrow beam part comprises at least one beam forming beam of a linear shape, a Y-shape, a T-shape or a coupled linear shape with a ring.

11. An angular velocity sensor according to claim 9, wherein one of the beams is a drive beam, one of the beams is a feedback beam and two of the beams are detection beams and further including a drive circuit connected to the drive beam, a feedback circuit connected to the feedback beam and a detection circuit connected to the detection beams.

12. An angular velocity sensor according to claim 11, wherein each of the support body, the four beams, the coupling part and the vibrating weight is formed from a silicon on insulator substrate.

* * * * *